United States Patent
Turner (10) Patent No.: US 10,268,016 B1
(45) Date of Patent: Apr. 23, 2019

(54) METHOD AND APPARATUS FOR DEVELOPMENT OF A COMMUNICATION LINE ONTO A SURFACE SUCH AS A ROADWAY OR PATHWAY

(71) Applicant: TRAXyL, Inc., Warrenton, VA (US)

(72) Inventor: Daniel Ryan Turner, Arlington, VA (US)

(73) Assignee: TRAXYL, INC., Warrenton, VA (US)

( * ) Notice: Subject to any disclaimer, the term of this patent is extended or adjusted under 35 U.S.C. 154(b) by 34 days.

(21) Appl. No.: 15/414,218

(22) Filed: Jan. 24, 2017

Related U.S. Application Data (62) Division of application No. 14/672,256, filed on Mar. 30, 2015, now Pat. No. 9,588,315.

(60) Provisional application No. 61/972,216, filed on Mar. 28, 2014.

(51) Int. Cl.
*G02B 6/46* (2006.01)
*G02B 6/44* (2006.01)

(52) U.S. Cl.
CPC ............. *G02B 6/46* (2013.01); *G02B 6/4457* (2013.01); *G02B 6/4463* (2013.01)

(58) Field of Classification Search
CPC ............. G02B 6/46; G02B 6/50; G02B 6/504
See application file for complete search history.

(56) References Cited

U.S. PATENT DOCUMENTS

| | | | | |
|---|---|---|---|---|
| 3,552,417 A | * | 1/1971 | Goff | ............... B05B 7/32 137/98 |
| 3,911,390 A | | 10/1975 | Myers | |
| 4,507,012 A | * | 3/1985 | Corcoran | ............... E01C 23/06 404/110 |
| 4,521,767 A | | 6/1985 | Bridge | |

(Continued)

FOREIGN PATENT DOCUMENTS

| | | | |
|---|---|---|---|
| DE | 10163464 C1 | 6/2003 | |
| JP | 07188583 A * | 7/1995 | ............. C08G 18/10 |
| JP | 09-224313 A | 8/1997 | |

OTHER PUBLICATIONS

Chung, Shun L., et al., "Fiber Optical Sensors for High-Speed Rail Applications", Final Report for High-Speed Rail IDEA Project 19, Innovations Deserving Exploratory Analysis Programs, Aug. 2003, (40 pages).

*Primary Examiner* — Charlie Y Peng
(74) *Attorney, Agent, or Firm* — Buchanan Ingersoll & Rooney PC (57) ABSTRACT

An apparatus for adhering a communication line to a surface. The apparatus includes a main body moveable in an advancing direction and a communication line holder configured to deploy the communication line onto the surface. The communication line holder is mounted on the main body. The apparatus also includes a container to store a protectant. The container is mounted on the main body. The apparatus further includes a protectant applicator connected to the container and configured to eject the protectant onto the surface. The protectant applicator is positioned closer to the rear end of the main body than the communication line holder so that the ejected protectant is applied onto the communication line that has been deployed on the surface. The apparatus includes a shaping template connected to the main body. The shaping template includes an opening and is (Continued)

positioned to contact the surface when the main body advances.

14 Claims, 7 Drawing Sheets

(56) References Cited

U.S. PATENT DOCUMENTS

| | | |
|---|---|---|
| 4,789,266 A | 12/1988 | Clarke et al. |
| 4,929,051 A | 5/1990 | Rogler et al. |
| 5,260,520 A | 11/1993 | Muhs et al. |
| 5,879,109 A * | 3/1999 | Finzel ..................... E02F 5/12 138/105 |
| 6,236,798 B1 | 5/2001 | Finzel et al. |
| 7,112,746 B2 | 9/2006 | Tsukahara et al. |
| 8,080,901 B2 | 12/2011 | Doraisamy |
| 9,537,292 B2 * | 1/2017 | Gustavsson ............ E02F 5/101 |
| 2002/0038716 A1 | 4/2002 | Pineda |
| 2005/0191133 A1 * | 9/2005 | Purcell .................. G02B 6/504 405/157 |
| 2011/0315259 A1 | 12/2011 | Kelly |
| 2012/0066987 A1 | 3/2012 | Malofsky et al. |
| 2014/0020815 A1 | 1/2014 | Dickinson et al. |
| 2014/0270971 A1 | 9/2014 | Allouche et al. |
| 2014/0294917 A1 | 10/2014 | Palchik et al. |
| 2015/0125218 A1 | 5/2015 | Gustavsson et al. |
| 2015/0129126 A1 | 5/2015 | Saito et al. |
| 2015/0310964 A1 | 10/2015 | Larson et al. |

\* cited by examiner

METHOD AND APPARATUS FOR DEVELOPMENT OF A COMMUNICATION LINE ONTO A SURFACE SUCH AS A ROADWAY OR PATHWAY

CROSS-REFERENCE TO RELATED APPLICATIONS

This application is a divisional application of U.S. patent application Ser. No. 14/672,256 and claims the benefit of Provisional Application 61/972,216, filed Mar. 28, 2014 by the present inventor.

BACKGROUND—PRIOR ART

The following is a tabulation of some prior art that may be relevant:

| U.S. Patents | | | |
|---|---|---|---|
| Pat. No. | Kind Code | Issue Date | Patentee or Assignee |
| 8,080,901 | B2 | Dec. 20, 2011 | Loganathan Doraisamy |
| 7,112,746 | B2 | Sep. 26, 2006 | Nobuhiko Tsukahara et al. |
| 4,521,767 | | Jun. 4, 1985 | Richard F. Bridge |
| 3,911,390 | | Oct. 7, 1975 | Richard H. Meyers |

| U.S. Patent Application Publications | | | |
|---|---|---|---|
| Pub. No. | Kind Code | Pub. Date | Applicant |
| 2014/0020815 | A1 | Jan. 23, 2014 | Paul R. Dickinson et al. |
| 2002/0038716 | A1 | Apr. 4, 2002 | Ronald Anthony Pineda |

| Foreign Patent Documents | | | | |
|---|---|---|---|---|
| Foreign Doc. No. | Country Code | Kind Code | Pub Date. | Patentee |
| 9935346 | WO | A1 | Jul. 15, 1999 | Helideo Costa-Elias et al. |
| 2762155 | FR | A1 | Oct. 16, 1998 | Giebel Wolfgang et al. |
| 2002131024 | JP | | May 9, 2002 | Ryoji Kobayashi et al. |
| 7318741 | JP | A | Dec. 8, 1995 | Yamada Taro |

Some of the prior art above has low relevance to this application. Doraisamy Loganathan (2011) addresses electrical power generation from a road surface. Richard F. Bridge (1985) deals with using a fiber link in a security trip wire system. Richard H. Myers (1975) speaks of a road traffic monitoring system. Ryoji Kobayashi et al. (2002) has an overhead projector application. Yamada Taro (1995) presents a cable/connector assembly.

The remaining prior art for installing fiber optic cable may be divided into two categories. One category, illustrated by Nobuhiko Tsukahara et al. (2006) and by Dickinson et al. (2014), addresses the installation of fiber on or inside a building but does not provide a capability for fiber installation over any appreciable distance. Nobuhiko Tsukahara et al. (2006) and Dickinson et al. (2014) also do not protect the fiber on the ground from vehicle or foot traffic. The second category of prior art does reference a capability for installation of communication lines over an appreciable distance and will be addressed below.

The usual process for manufacturing a communications cable for distance installation varies widely but usually consists of extruding plastic core tubes around fibers, helically wrapping the tubes around a central strength member, building up several layers of protective sheathing, surrounding the sheathing with armor such as steel and surrounding the armor with a heavy polymer jacket.

Once a cable is manufactured, it can be pulled through conduits, hung along telephone poles, buried inside trenches as per Giebel Wolfgang et al. (1998), installed using a horizontal directional drill, micro-trenched into a roadway as per Helideo Costa-Elias et al. (1999), or installed on a roadway by using a flat fiber conduit for further protection, as per Ronald Anthony Pineda (2002).

The use of armor and other materials increases the weight, fabrication cost, and installation footprint of the fiber cable. The larger installation footprint often requires the significant disruption and repair of the installed route, all of which contributes to higher installation cost.

When installing below the surface, fiber cables can either be direct-buried or installed into a conduit to further protect the cable. Conduit is often installed by trenching into the ground or using a horizontal directional drill to install conduit over short distances without disrupting the surface. The use of conduit requires the added cost and overhead of conduit installation along with the fiber cable manufacturing and installation.

Aerial installs are performed by draping communication cables on communication or power distribution poles. Although this can provide for a quicker install than trenching or micro-trenching, it has several downsides. If the poles do exist, they could already be holding the maximum weight allowed, rendering them useless for expansion. Additionally, trees, buildings, personal property, and other utilities, often interfere with the installation of new poles or cables. Installers are endangered by nearby local traffic, the height at which they must work, and the often dangerous voltages in the vicinity of their work area. Overhead installations are affected by unavoidable weather conditions, such as ice storms and thunderstorms. These environmental conditions often damage overhead installations for extended periods of time and require expensive repairs. Additionally, aerial installations are not aesthetically pleasing, compared to other lower visibility installation techniques.

Plowing, direct burial or other similar installs email an array of machines that utilize a cutting blade to trench through soil or other natural ground substances. The communication cable is installed in a single-pass process, first by cutting the trench, burying the cable, and then backfilling the trench with a filler material suitable for the ground surface. This installation technique as per Giebel Wolfgang et al. (1998) causes significant disruption to local roadway infrastructure with attendant business impacts and transportation delays.

Horizontal directional drilling is a method of installing fiber optic cables underground without having to disrupt local surface features. This is typically done to install cables under surface obstacles that cannot be avoided by route planning such as rivers, roads, and buildings. There is risk of damaging other underground infrastructure as the drilling bit bores through the ground This method is equipment and labor intensive, and is more of an obstacle avoidance technique than a complete end to end communication cable installation technique.

A micro-trenching install is similar to a trenching or plowing install, but the cutting tool and ground opening are smaller, and the filler materials required are typically less than trenching. The micro-trenching install is mainly used on roadways and utilizes a heavy duty diamond saw blade that cuts a narrow, perhaps inches wide, section of a roadway or similar surface to a predetermined depth dependent on the location. A communication cable is installed or micro duct is inserted for later filling with a communication cable. After that, the micro-trench is backfilled with an aggregate and other approved materials. The risks of this technique as per Helideo Costa-Elias et al. (1999) include cutting of an existing utility, the infliction of damage to the integrity of the road surface requiring significant repair, and many of the same risks to installers as the roadside aerial installation. Additionally, micro-trenching is not preferred in situations that involve private roads, shallow road surfaces, bridges, and tunnels, to name a few.

The use of traffic resistant conduit, as per Ronald Anthony Pineda (2002), installed directly on a roadway entails the added cost of fabricating and installing the conduit.

Prior art communication line installations limitations include: a limited ability to economically provide rural and some suburban service on an individual customer basis, a limited ability to reach rural and suburban customers on an economical basis, installation times that often range from weeks to months to years, installation methods that usually entail significant business impacts due to traffic disruption along with increased labor, time, and costs, and often an inherently higher risk of injury to installers (i.e. trench collapse, traffic accidents, heavy equipment risks, accidental damage to other utilities, and high voltage electric shock for installers).

SUMMARY

In one or more aspects, the embodiment is a method of laying out a communication line and using a protectant to adhere and encase the communication line onto a surface.

ADVANTAGES

This application relates to the deployment of a communication Hoc such as optical fiber or fibers directly onto a surface such as a roadway, a pathway, or a walkway, and the use of a hard and weather resistant protectant such as an ultraviolet cured urethane resin to protect the communication line from the effects of traffic and weather.

All prior art methods for installing optical fiber on land, including building armored cables around fibers, burying cables inside trenches, pulling cables through conduits, hanging cables along telephone poles, burying cables inside trenches, drilling horizontally to pull cables, micro-trenching cables into roadways, and installing flat road surface conduit require more labor, materials, equipment, and time than this method describes.

Advantages of the method include the preservation of road surface integrity, installation without disrupting existing utilities and infrastructure, installation with less business and traffic impact, installation requiring reduced equipment, materials, and labor, faster installation, reduced installation cost, and the ability to provide an economically viable communication path and connection on a per-customer demand basis. This method offers reasoning from first principles with a cost structure orders of magnitude cheaper compared to existing prior art and can offer new capabilities at a lower cost than incumbents.

The low cost of installation will allow the deployment of redundant network links that will support the distribution of service via alternate communication routes if one link is damaged or degraded. Real-time failover techniques will pinpoint the site of the damage and will reroute data flow to unload the affected link. This will minimize the impact to customers until repairs are made.

The cost of repairs will be low because the communication line will be readily accessible without excavation or overhead rigging.

While fiber-optic systems excel in high-bandwidth installations such as the communications backbone and the middle-mile, optical fiber has been unable to provide cost-effective broadband to the last-mile, i.e. all the way to every end user.

The described method of installing a communication line on a surface, such as a roadway, protected by a hard and weather-proof covering, such as an ultraviolet cured urethane resin, allows for quick, safe, reliable, and less expensive communication line installations. By leveraging existing network effects from the second industrial revolution, this method will contribute greatly to solving the last-mile problem—delivery of high bandwidth fiber directly to the home. By using existing roadways, this method provides a viable deployment option that will enable communication infrastructure expansion all the way to the customer's home or business premises. This network expansion will allow for small business growth and will drive development and jobs that will further increase economic development.

DRAWINGS—REFERENCE NUMERALS 100 surface
102 installed communication line 104 cured protectant
106 shaped protectant 108 unshaped protectant 110 protectant shaping template 112 bare communication line 114 bare communication line guide 116 spool
118 protectant container
120 protectant applicator
122 curing lamp
124 surface blower
126 chassis
128 wheel(s)
130 direction of travel
132 air pump
500 surface obstacle
600 surface crack
700 typical communication cable
702 typical communication line splice
704 pit, origin or terminus 706 pit lid
708 typical communication line
710 pit transition

DETAILED DESCRIPTION—FIRST EMBODIMENT

Figure 1:
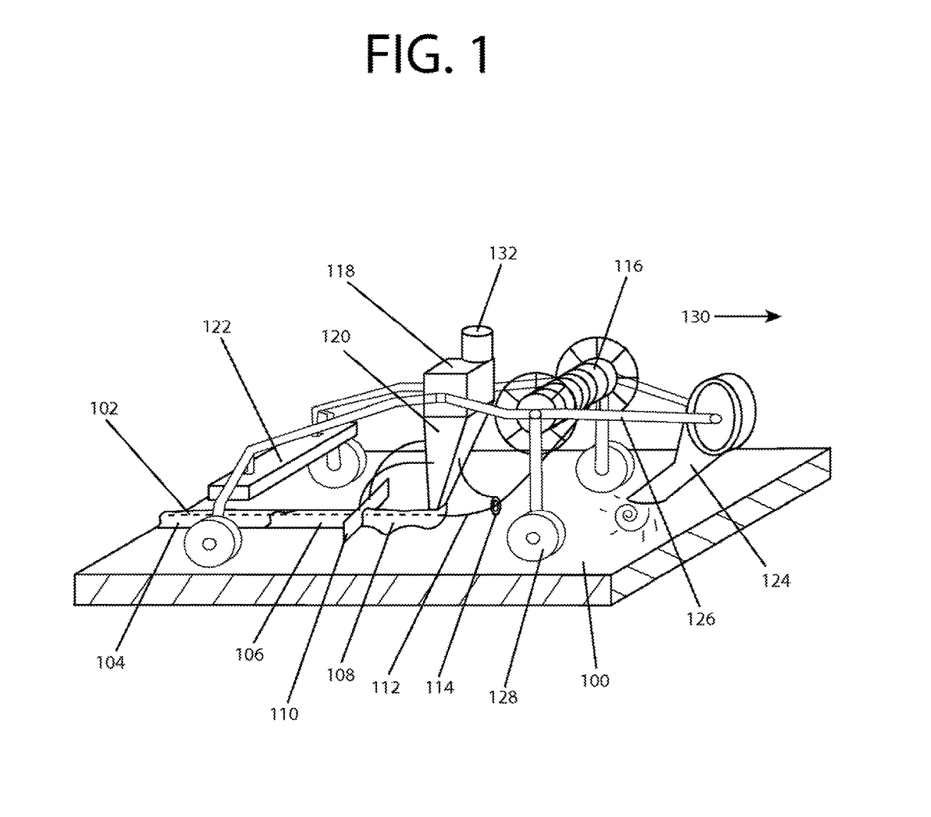
FIG. 1 is a general perspective overview of the apparatus in accordance with the first embodiment.

In general, FIG. 1 shows a perspective view of one embodiment of a communication line deployment apparatus. The embodiment includes a surface blower 124 mounted to a chassis 126 of the apparatus. A protectant shaping template 110 is mounted to a protectant applicator 120. A bare communication line guide 114 is mounted to protectant applicator 120. Protectant applicator 120 is mounted to a protectant container 118. An air pump 132 is attached to protectant container 118. Protectant container 118 is mounted to chassis 126. A curing lamp 122 is mounted to chassis 126. A set of wheels 128 is mounted to chassis 126. The wheels allow the apparatus to move in a direction of travel 130 along a predetermined route on a surface 100 such as asphalt. A vehicle with typical tow hitches (not shown) is connected to chassis 126 near the front of the apparatus. A spool 116 is mounted to chassis 126. Spool 116 holds a predetermined length of a bare communication line 112 such as optical fiber. Bare communication line 112 unwinds from spool 116 at a rate commensurate with the apparatus speed and direction of travel 130. Bare communication line 112 passes through bare communication line guide 114 before placement onto surface 100.

In general, in an aspect, protectant container 118 holds an unshaped protectant 108 material. Under air pressure, unshaped protectant 108 moves from protectant container 118 and into protectant applicator 120. Protectant applicator 120 ejects unshaped protectant 108 onto bare communication line 112 surrounding and encasing the bare communication line as it lays on surface 100.

Figure 2:
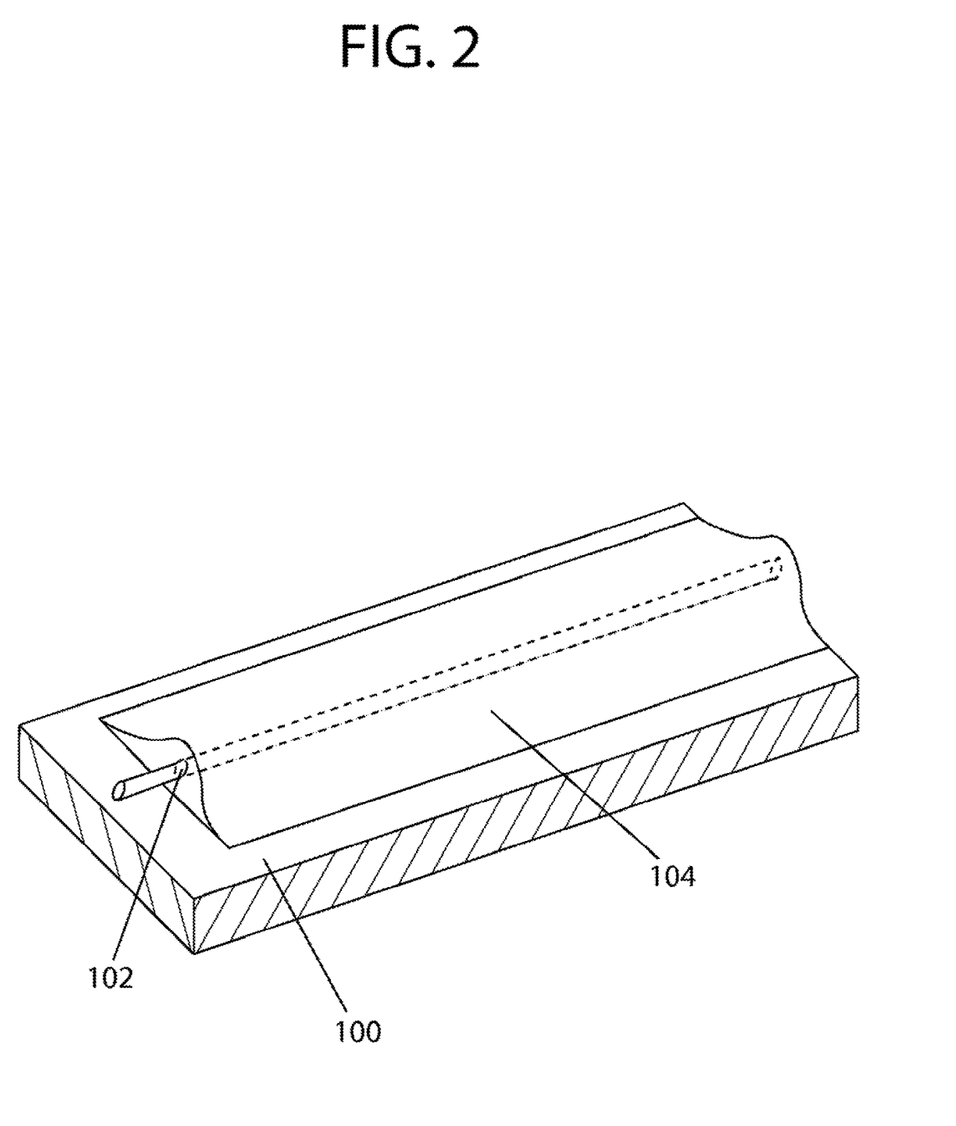
FIG. 2 is a perspective view of a single communication line encased in protectant that is applied to a surface in accordance with one embodiment.
Figure 4:
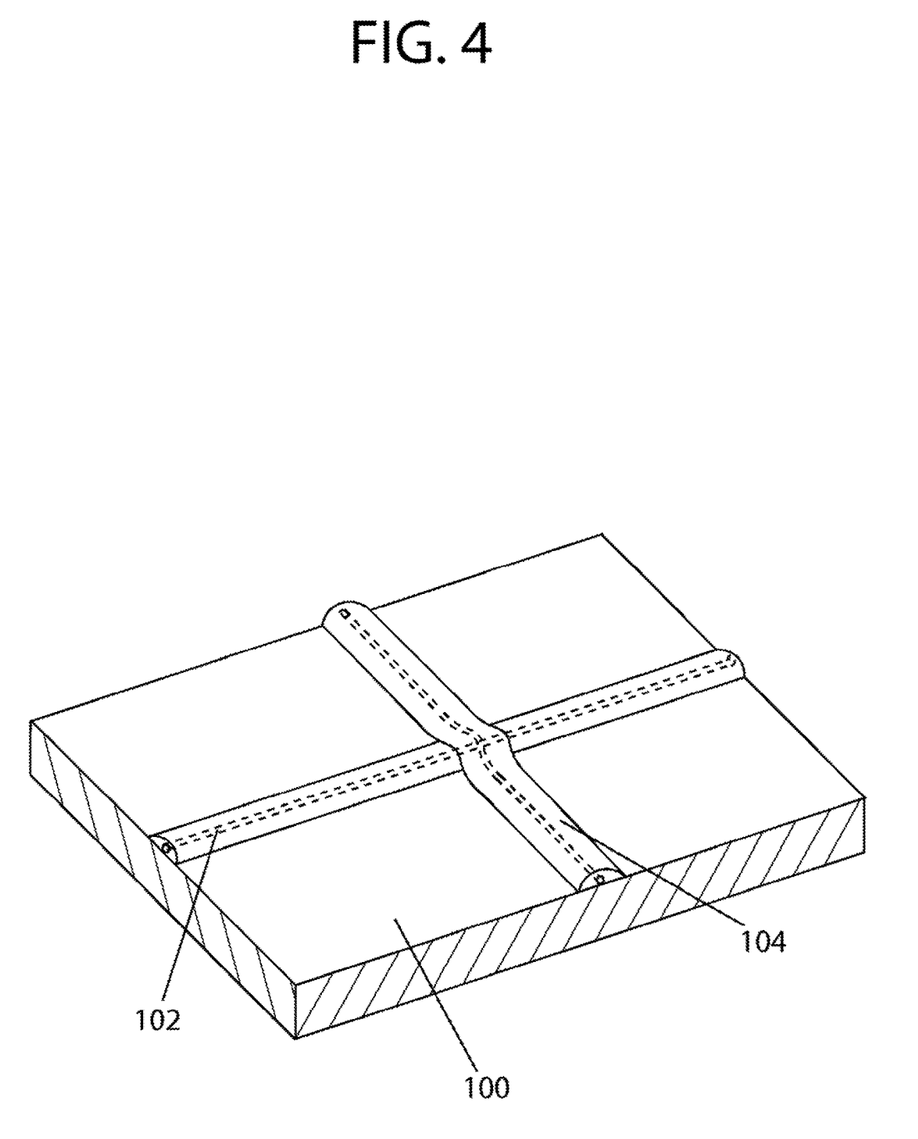
FIG. 4 is a perspective view showing one installation crossing over another installation whereby both installations are applied to a surface in accordance with another embodiment.

Unshaped protectant 108 along with bare communication line 112 pass through protectant shaping template 110. Protectant shaping template 110 shapes unshaped protectant into a shaped protectant 106. Curing lamp 122 cures shaped protectant 106 to a cured protectant 104. Cured protectant 104 encloses the line resulting in installed communication line 102. Cured protectant 104 provides a hardened and weatherproof encasement for installed communication line 102. When cured, the predetermined shape of cured protectant 104 is similar to the shape shown in FIG. 2 and provides low resistance to vehicle tires that may drive over the installation. The shape also permits communication line crossovers to occur without exceeding the communication line's minimum bend radius, as shown in FIG. 4.

It is presently contemplated that unshaped protectant 108 held in protectant container 118 of the embodiment of FIG. 1 is an ultraviolet cured urethane resin. Sources of the material are available from Sunrez Corporation of El Cajon, Calif., 92020, or Epoxies, Etc. of Cranston. R.I., 02921. The resin is selected based on predetermined viscosity, non-conductivity, hardness, cured strength, impact resistance, service temperature, and adhesive tensile shear characteristics. The resin is chosen to have a long service life and to meet flammability and other compliance requirements when cured, for application onto the intended surface. Cured protectant 104 is formulated to withstand the dynamic and static pressures presented by both pedestrian and vehicle traffic as the bond of cured protectant 104 to surface 100 is robust.

The curing lamp is tailored to the specific protectant used. In this embodiment, it is a high power ultraviolet lamp capable of curing the resin in approximately two to five seconds.

Protectant container 118 and protectant applicator 120 are opaque to ultraviolet light and block the light from causing any unwanted cure inside these components.

The overall material thickness of the cured protectant 104 is approximately three to ten millimeters. Cured protectant 104 does not degrade the frictional coefficient required by a vehicle tire against surface 100, even when wet.

Figure 7:
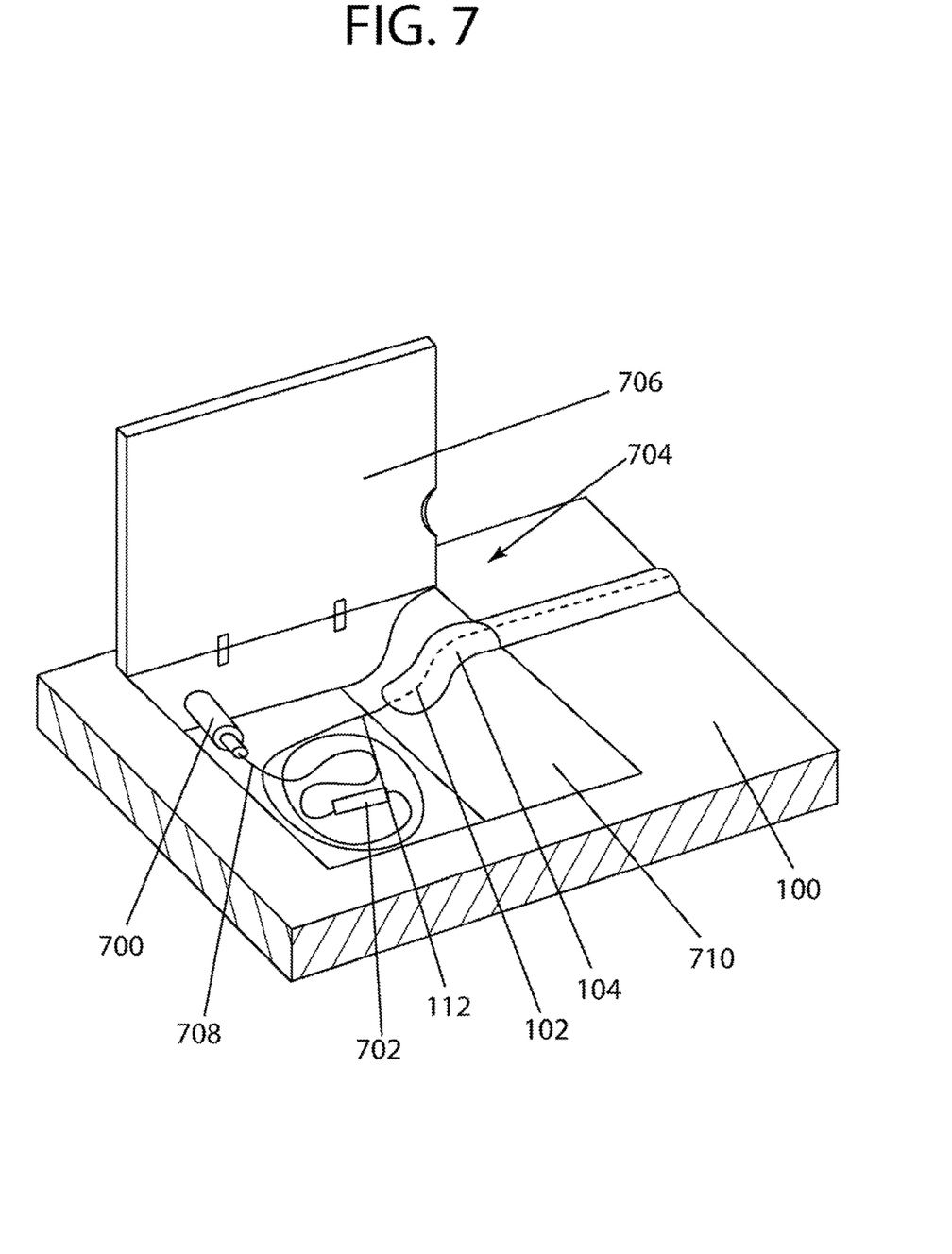
FIG. 7 is a perspective view of the origin or terminus pit in accordance with the first embodiment.

In general, in one aspect of the embodiment, FIG. 7 shows a perspective view of either an origin pit or a terminus pit 704 (origin and terminus pits are functionally equivalent). Pit 704 includes a pit lid 706 that can be closed and sealed to protect the contents of the pit from exposure to weather or traffic. Pit 704 contains a typical communication cable 700 that enters from the side of the pit below surface 100. Typical communication cable 700 contains a typical communication line 708 that is exposed inside pit 704. Pit 704 receives bare communication line 112 from spool 116 of the apparatus. Pit 704 contains a typical communication line splice 702 that connects typical communication line 708 to bare communication line 112. Pit 704 contains a predetermined amount of cured protectant that adheres bare communication line 112 to a pit transition 710.

OPERATION—FIRST EMBODIMENT

Figure 5:
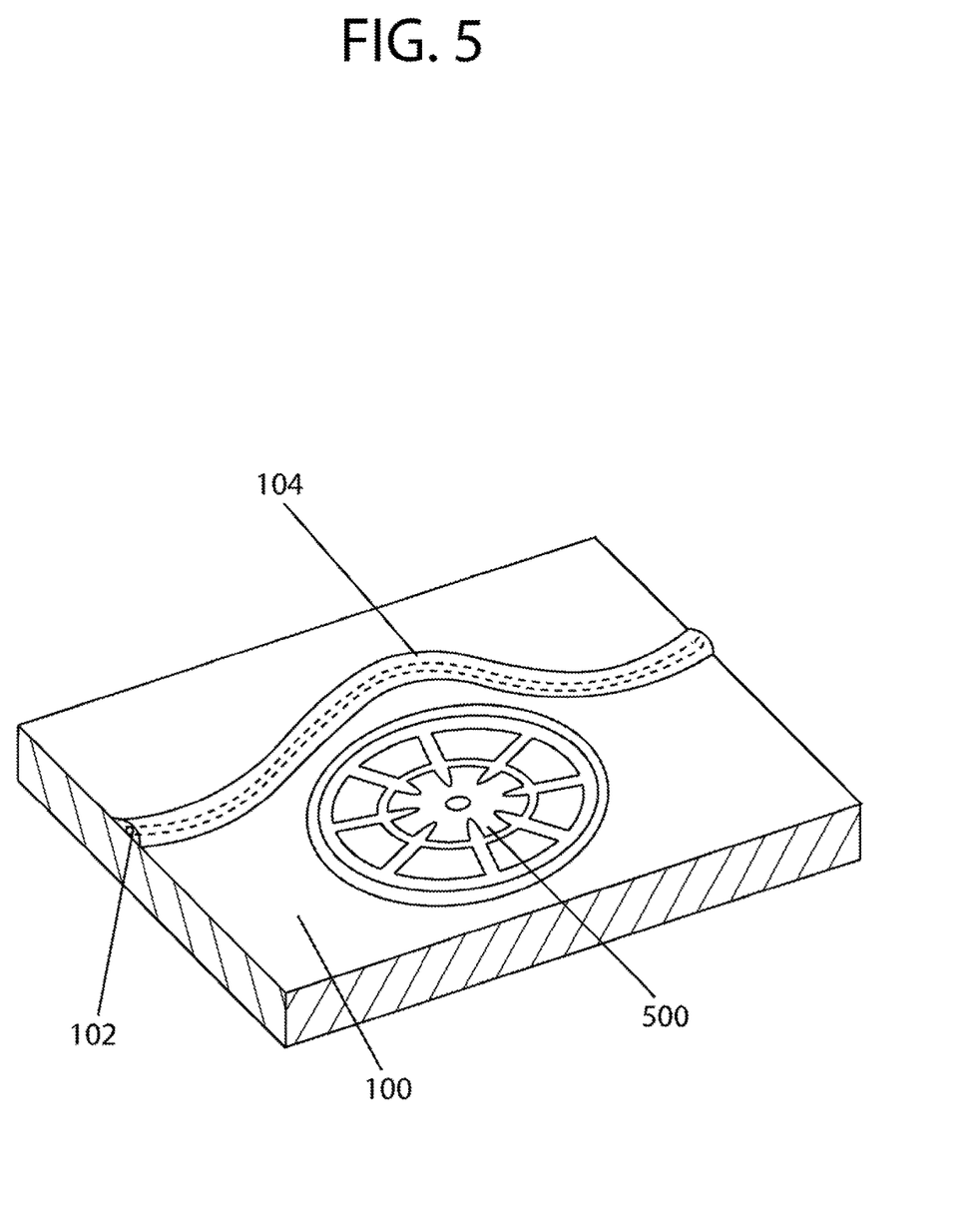
FIG. 5 is a perspective view of an installation bypassing a surface obstacle in accordance with another embodiment.

First, a route survey is performed and consists of optically surveying possible routes to select the optimum route for deploying a communication line such as an optical fiber from an origin to a terminus, using pits 704 similar to one shown in FIG. 7. The route survey will record all road surface conditions and hazards including; boundaries, turns, lengths, significant path defects, cracks, depressions, railroad tracks, bridge transition joints, and any other surface obstacle to avoid such as manholes as shown in FIG. 5. Following the survey, the desired route for the communication line installation is selected, origin and terminus pits 704 are installed, and typical communication cables 700 are installed into the sides of origin and terminus pits 704.

Next, a predetermined amount of bare communication line 112, that defines one end of the line, is unwound from spool 116 and placed inside origin pit 704. A predetermined section of bare communication line 112 is covered with a predetermined amount of unshaped protectant 108 that is then cured, adhering bare communication line 112 to origin pit transition 710. Bare communication line 112 is then spliced to typical communication line 708 from typical communication cable 700 using typical communication line splice 702. Once the bare communication lines are spliced, origin pit lid 706 can be closed to protect the bare communication lines and splice from weather, vehicle traffic, or pedestrian traffic.

The operation of the apparatus follows a method that include four phases: Path Preparation, Communication Line Application, Protectant Application, and Protectant Cure. These phases are conducted and completed in a single transit of the predetermined route from origin pit 704 to terminus pit 704 by the vehicle with typical tow hitches (not shown) that tows the apparatus, functionally similar to one shown in FIG. 1, in direction of travel 130.

Path Preparation—This phase includes the use of surface blower 124 utilizing high pressure air to blow loose debris away from the predetermined installation path along surface 100.

Communication line Application—After the Path Preparation phase is the Communication Line Application phase where bare communication line 112 unwinds from spool 116 and passes through bare communication line guide 114. Bare communication line guide 114 guides bare communication line 112 onto surface 100 along a predetermined path.

Protectant Application—This phase follows the Communication Line Application phase and entails the application of unshaped protectant 108 stored in protectant container 118. Air pressure from air pump 132 pushes unshaped protectant 108 from protectant container 118 into protectant applicator 120. Protectant applicator 120 ejects unshaped protectant 108 onto previously placed bare communication line 112, completely encasing and covering it. As the apparatus continues in direction of travel 130, unshaped protectant 108 and the communication line pass through protectant shaping template 110 that shapes the highly viscous protectant material around the communication line and into shaped protectant 106.

Protectant Cure—As the apparatus continues moving in the predetermined direction of travel, shaped protectant 106 is cured in approximately two to live seconds with curing lamp 122 resulting in cured protectant 104. Cured protectant 104 encases the communication line resulting in installed communication line 102 on surface 100.

Upon reaching terminus pit 704, a predetermined amount of bare communication line 112 is unwound and separated from spool 116. Separated bare communication line 112 is placed inside terminus pit 704 along pit transition 710. The section of bare communication line 112 that extends along terminus pit transition 710 is covered with a predetermined amount of unshaped protectant 108. Unshaped protectant 108 is then cured, adhering bare communication line 112 to terminus pit transition 710. Bare communication Sine 112 is spliced to typical communication line 708 using typical communication line splice 702 shown in FIG. 7. After the final connection is made and the link established, terminus pit lid 706 is closed, protecting the splice and the communication lines from weather and traffic.

It should be understood that the foregoing description of the embodiment and operation is intended merely to be illustrative thereof and that other equivalents, embodiments and modifications of the invention may be apparent to those skilled in the art.

DESCRIPTION—ADDITIONAL EMBODIMENTS

In cases in which the communication line is transparent and the cured protectant is transparent, the installation could be nearly invisible. In some embodiments, the communication line and protectant could be painted or tinted or otherwise colored so that it could blend into the roadway or pathway surface, or colored so that it could stand out against the surface so as to be easily identified.

In some embodiments, a device such as an Optical Time Domain Reflectometer is connected to the bare communication line at the origin of the installation.

In some embodiments, the apparatus is sized to be, or to be part of, a cart that is pushed or pulled by a human being, or attached to a vehicle that is driven, towed, pushed, remote driven, or otherwise self-propelled.

In some embodiments, a chassis mounted computer could be used during the installation of the communication line by the apparatus.

In some embodiments, a line tension management system is mounted on the chassis and connects with the bare communication line and the spool.

In some embodiments, a protectant heater is mounted on the chassis directly after the protectant shaping template but before the curing lamp.

In some embodiments, a computer controlled valve is connected to an application nozzle. The application nozzle is connected to the tip of the protectant applicator.

In some embodiments, the surface is made up of asphalt, concrete or similarly hard material.

In some embodiments, a hard and narrow surface could be installed in anticipation of the communication line laying process, such as by pouring a thin strip of concrete across a field or along a gravel or dirt road.

In some embodiments, the number of wheels on the apparatus could be one or more, or alternatively the apparatus could be tracked.

Figure 3:
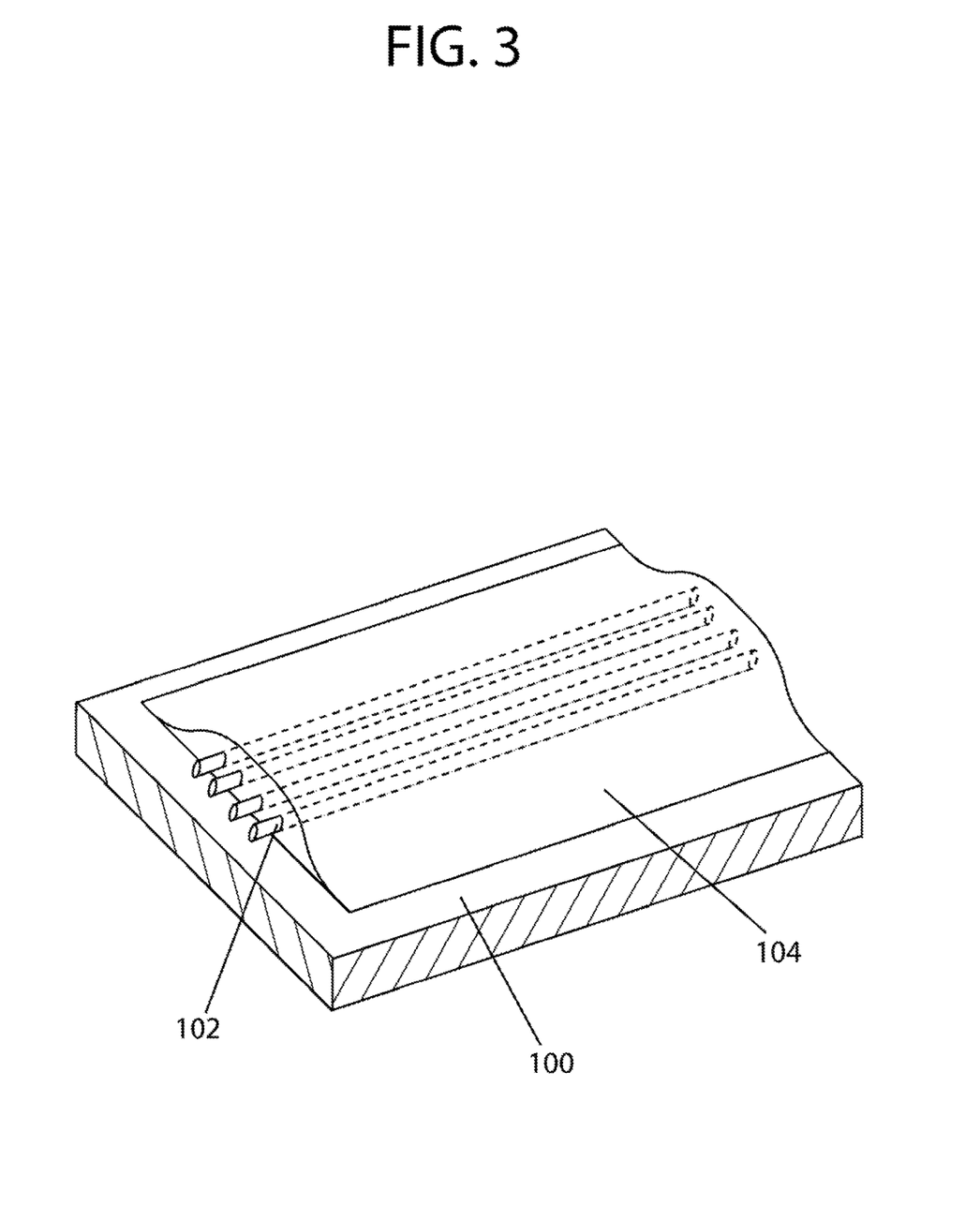
FIG. 3 is a perspective view of a plurality of communication lines encased in protectant that is applied to a surface in accordance with another embodiment.

In some embodiments, a plurality of communication lines from multiple spools could be installed as a parallel grouping under the protectant during one pass of the apparatus as shown in FIG. 3.

In some embodiments, installed communication lines could cross over one another, as shown in FIG. 4.

In some embodiments, other materials may be suitable for the protectant, such as polyester, vinylester, or polyepoxides. It is also conceived that a layer of asphalt, concrete, or similar material could be placed over the installed communication line as another type of protectant.

In some embodiments, the overall thickness of the applied protectant could be greater than ten millimeters.

In some embodiments, a height transition piece could be used during the installation of a communication line. The height transition piece is adhered to the surface at a height transition.

In some embodiments, a chassis mounted sliding rail system integrates with the chassis mounted computer. The sliding rail system includes a sliding rail that supports the protectant applicator, the bare communication line guide, the protectant shaping template, and the curing lamp.

In some embodiments, a longer array of curing lamps mounted to the chassis of the apparatus, or an array of curing lamps towed behind the apparatus, or a plurality of curing machines could follow the apparatus and allow the installation apparatus to achieve higher speeds during installation.

In some embodiments, a vacuum, rotating or sweeping brush, or scraping tool may be mounted on the chassis with or in place of the surface blower. It is also conceived that a debris skirt may be attached to the chassis.

In some embodiments, the types of pump used to move the unshaped protectant from the protectant container could be positive displacement pumps, impulse pumps, velocity type pumps, or similar.

In some embodiments, a degreasing system is mounted on the chassis directly behind the blower.

In some embodiments, it may be determined that a mid-span access to repair or reroute the installed communication line is required after an installation has already occurred. It is contemplated that tools would be necessary for removing various amounts of protectant in order to gain access to the encased communication line. These tools could strip away, melt, or chemically dissolve the protectant, exposing the underlying bare communication line.

In some embodiments, it may be necessary to completely uninstall the communication line and protectant. It is contemplated that tools to scrape, abrade dissolve, or otherwise remove the cured protectant and line may be required.

In some embodiments, the origin and terminus pits may be other shapes and types of housings such as cylindrical, wall mounted, or above ground pedestals.

In some embodiments, the origin and terminus pit lids may be clear or made up of a photovoltaic power system. Solar powered add/drop multiplexers could be placed inside origin or terminus pits to allow for the branching of communication line signals. The add/drop multiplexers could alternatively be powered by utility power cables installed through the side of the origin or terminus pits.

OPERATION—ADDITIONAL EMBODIMENT

In some embodiments, the protectant applicator and bare communication line guide may move up and down to closely track surface height changes that sometimes occur along an installation route such as a speed bump, for example.

In some embodiments, the protectant applicator could squeeze, pump, expel, eject, etc. the unshaped protectant from within.

In some embodiments during the installation, a System Communication Test could be conducted using the Optical Time Domain Reflectometer that is connected to the bare communication line and could continuously monitor the installed communication line to detect a line anomaly alerting the installers of an installation error. Alternatively, the System Communication Test could occur after the installation of the communication line is complete to confirm the overall quality of the installation.

In some embodiments, the installation apparatus may optically register its position relative to the road boundary or curb using the computer that processes optical data collected on the previous route survey to aid the operator's adherence to the desired predetermined communication line route.

Figure 6:
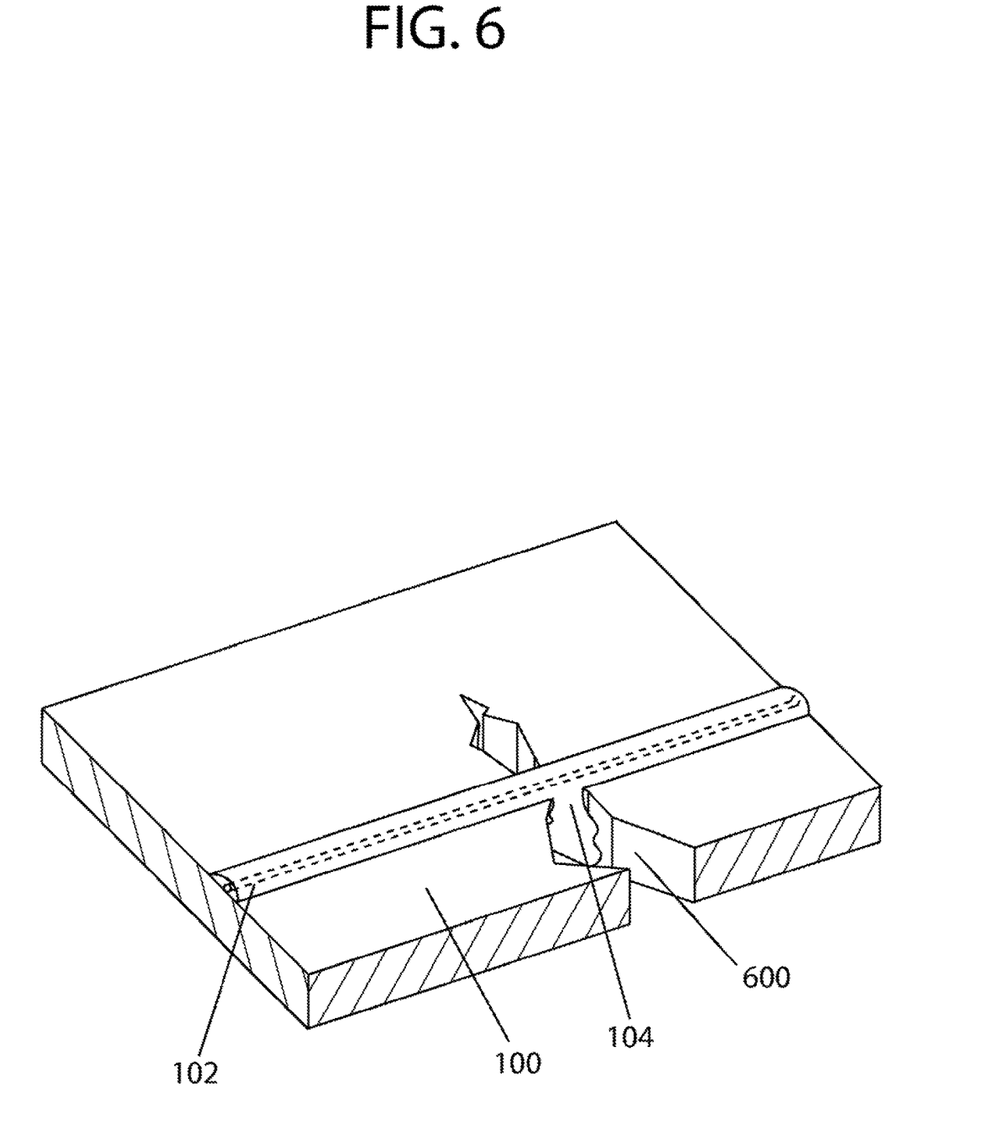
FIG. 6 is a perspective view of an installation bridging over a surface crack in accordance with another embodiment.

During the Path Preparation phase, an embodiment could include the computer controlled system that uses a high resolution radar, laser, or imaging sensor to measure the dimensions of the cracks and depressions that are encountered along the route. The computer could control the flow of the unshaped protectant in real time using the computer controlled valve feeding an application nozzle. This would allow for the real time application of unshaped protectant based on the varying rates of speed and the quality of the surface as the application nozzle moves in the direction of travel along the intended route similar to what is shown in FIG. 6. Alternatively, route spot repairs, such as for deep cracks, could be completed by a road work crew before the installation apparatus transits the selected route.

In some embodiments, protectant could be applied and partially cured prior to the communication line being laid so as to provide a smooth, pliable, and semirigid base for the communication line installation.

In some embodiments, it is conceived that an abrupt surface height change, such as a curb, is encountered during installation and could exceed the minimum bend radius allowed for the communication line. A piece specifically shaped for the transition requirement, similar to the shape of the pit transition shown in FIG. 7, could be adhered to the surface at the height transition thus avoiding the violation of the minimum bend radius limit of the communication line.

In some embodiments, the bare communication line slack and tension could be controlled by the line tension management system that actively monitors the slack of the communication line as it comes off the spool and adjusts the level of slack as the bare communication line enters the bare communication line guide.

In some embodiments, the components of the apparatus may be moved from side to side, orthogonal to the direction of travel, in order to avoid a surface obstacle similar to FIG. 5. Using the computer and the high resolution radar, laser, or imaging sensor data, the apparatus could detect an upcoming obstacle such as a manhole and command the sliding rail system to shift components of the apparatus left or right, without having the entire apparatus turn.

In some embodiments, the debris skirt may be utilized to prevent blowing debris from damaging surrounding property or causing injury to personnel.

In some embodiments, the degreasing system can degrease the surface of oils and grease and could be used prior to the application of the unshaped protectant to enhance the strength of the bond of the cured protectant to the surface.

In some embodiments, the sun could be used to cure the ultraviolet curable protectant installed by the apparatus.

In some embodiments, the protectant heater could be utilized to remove bubbles from the protectant after it passes through the protectant shaping template before being cured by the curing lamp.

In some embodiments, the origin or terminus pits could have a plurality of communication cables installed and a plurality of surface lines installed as per the operation of the first embodiment.

In some embodiments, tools are used to access the installed communication line mid-span in order to splice to another bare communication line that is staged for installation or repair around a failure of the installed communication line. After access has occurred, a typical splice is performed. To protect the splice, a predetermined amount of the unshaped protectant could be applied to the access location and cured, re-encasing and protecting the installed communication line and the typical communication line splice.

In some embodiments, re-coating the cured protectant may be required and the apparatus could transit the installed communication line to apply additional coatings of the protectant.

CONCLUSION, RAMIFICATIONS, AND SCOPE

Thus, the reader will see that at least one embodiment can be used to more economically deploy a communication line in such a fashion as to realize the potential of broadband delivery directly to the individual end user. This method provides a higher speed and lower cost installation than all prior art methods for installing communication lines on land, including building armored cables around fibers, burying cables inside trenches, pulling cables through conduits, hanging cables along telephone poles, burying cables inside trenches, drilling and installing cables horizontally, micro-trenching cables into roadways, and installing flat conduit on a roadway. All prior art methods require more labor, materials, equipment, and time than the method claimed.

This installation method deploys communication lines without degrading road surface integrity and with little if any business impact and traffic delay. There is also little risk of damage to existing utilities and infrastructure.

The method may be installed with a reduced amount of material and equipment as compared to other installation techniques.

Redundant links will provide greater network reliability due to the ease and speed of installing alternative communication routes with an auto-fail-over recovery capability.

The method allows for quick, safe, reliable, and less expensive communication line installations that will contribute to solving the last mile problem.

The method provides a viable deployment option that will drive development, jobs, growth and real communication infrastructure expansion all the way to the customer premises.

While the above description contains many specificities, these should not be construed as limitations on the scope, but rather as an exemplification of several embodiments thereof. Many other variations are possible. For example, a machine that lays a communication line while road surface marks are installed, or a machine that lays a communication line at the same time that a road is paved are all possible.

Alternative embodiments of the method consist of a single communication line covered with a single protectant, or a plurality of communication Sines installed in parallel covered by a single protectant or plurality of protectant layers.

Another embodiment may consist of deploying various sizes of communication lines at the same time.

Ramifications could include alternate protectants, some having more elastic properties than others. For example, a compliant material could coat the bare communication line first, followed by the application of a hardened protectant that encases the compliant material and communication line.

The embodiments consist of deploying on any outside contiguous route such as a roadway, a highway, a street, a driveway, a bike path, a walkway, a sidewalk, or-a neighborhood pipestem. It is further contemplated that the embodiments could consist of deploying communication lines indoors, such as along a factory floor, in a concert hall, or throughout an exposition center.

The communication line could be deployed in a single pass by the installation apparatus with or without a prior route survey or the communication line could be installed in separate passes using a plurality of machines that deploy the communication line over several transits of the route. This communication line could also be manually deployed by hand for short distances without the use of the apparatus, while still following the steps of the method.

The embodiment could be used by telecommunication providers for secondary backhaul, by utility providers during routine business operations, by emergency communication providers following a natural disaster, by event staff setting up temporary gatherings such as concerts or festivals, and by military forces operating in newly acquired territory.

These and other aspects, features, and implementations, and combinations of them, can be expressed as methods, means and steps tor performing functions, developing apparatus, systems, components, compositions of matter, and in other ways.

Accordingly, the scope should be determined not by the embodiments or the examples illustrated, but by the appended claims and their legal equivalents.

Other aspects, features, implementations, and advantages will be apparent from the following claims.

What is claimed is:

1. An apparatus for adhering a communication line to a surface, the apparatus comprising:
    a main body moveable in an advancing direction, the main body possessing a forward end and a rear end;
    a plurality of rotatable bodies that contact the surface when the main body moves in the advancing direction, the plurality of rotatable bodies supporting the main body, the plurality of rotatable bodies all contacting the surface at a plurality of respective contact points on the surface;
    a communication line holder configured to deploy the communication line onto the surface, the communication line holder being mounted on the main body, the communication line configured to be deployed by the communication line holder to contact the surface at a line contact point;
    a container configured to store a protectant, the container being mounted on the main body;
    a protectant applicator connected to the container and configured to eject the protectant onto the surface, the protectant applicator positioned closer to the rear end of the main body than the communication line holder so that the ejected protectant is applied onto the communication line that has been deployed on the surface; and
    the communication line holder and the rotatable bodies being configured such that the line contact point is coplanar with the plurality of respective contact points of the rotatable bodies.

2. The apparatus according to claim 1, wherein the rotatable bodies are a plurality of wheels, the plurality of wheels rotating when the main body moves in the advancing direction.

3. The apparatus according to claim 2, wherein
    the plurality of wheels include front wheels and rear wheels, and
    the communication line holder, the container, the protectant applicator, and the shaping template mounted on the main body are positioned between the front wheels and the back wheels.

4. The apparatus according to claim 1, comprising a shaping template connected to the main body, the shaping template comprising an opening and being positioned to contact the surface when the main body moves in the advancing direction.

5. The apparatus according to claim 1, further comprising:
    a blower connected to the main body configured to emit air to remove debris from the surface, the blower being mounted on the front end of the main body.

6. The apparatus according to claim 1, further comprising:
    a curing lamp connected to the main body, the curing lamp positioned closer to the rear end of the main body than the protectant applicator, the curing lamp being configured to cure the protectant that has been ejected by the protectant applicator into a solid protectant to encase the communication line on the surface.

7. The apparatus according to claim 1, further comprising a pump connected to the container, the pump being configured to pressurize the protectant within the container to urge the protectant towards the protectant applicator.

8. The apparatus according to claim 4, wherein
    the shaping template comprises two surface edges, the two edges being spaced apart from one another,
    the opening being positioned between the two edges of the shaping template, and
    the two edges of the shaping template contact and move along the surface at two spaced apart locations when the main body moves in the advancing direction.

9. The apparatus according to claim 4, wherein
    the container and the protectant applicator are integrally formed as a protectant applicator assembly, the protectant applicator assembly possessing a forward face and a rear face, and
    the shaping template is connected to the rear face of the protectant applicator assembly to extend behind the container in the advancing direction so that the shaping template is closer to the rear end of the main body than the protectant applicator.

10. The apparatus according to claim 9, further comprising a line guide connected to the forward face of the protectant applicator assembly, the line guide comprising a hole, wherein the communication line passes through the hole of the line guide before the communication line contacts the surface.

11. The apparatus according to claim 4, wherein the protectant applicator is spaced apart from the shaping template, the protectant applicator being positioned closer to the forward end of the main body than the shaping template.

12. An apparatus for adhering an elongated tubular body to a surface, the apparatus comprising:

a main body moveable in an advancing direction, the main body possessing a forward end and a rear end;

a plurality of rotatable bodies that contact the surface when the main body moves in the advancing direction, the plurality of rotatable bodies supporting the main body, the plurality of rotatable bodies each contacting the surface at a plurality of respective contact points on the surface;

a communication line holder configured to deploy the elongated tubular body onto the surface to contact the surface at a line contact point, the communication line holder being mounted on the main body;

a container comprising an unshaped protectant, the container being mounted on the main body, the unshaped protectant curing into a solid protectant after the unshaped protectant is ejected from the container;

a protectant applicator connected to the container and configured to eject the unshaped protectant onto the surface, the unshaped applicator being positioned closer to the rear end of the main body than the communication line holder so that the unshaped protectant is ejected on top of the elongated body on the surface when then main body moves in the advancing direction; and the communication line holder and the rotatable bodies being configured such that the line contact point is coplanar with all of the plurality of respective contact points of the rotatable bodies.

13. The apparatus according to claim 12, further comprising:

a shaping template connected to the main body, the shaping template comprising an opening and being positioned to contact the surface when the main body moves in the advancing direction, the unshaped protectant passing through the opening of the shaping template when the main body moves in the advancing direction and after the unshaped protectant is ejected onto the surface, wherein the unshaped protectant cures into the solid protectant to encase the tubular body after the unshaped protectant has passed through the opening in the shaping template.

14. The apparatus according to claim 12, wherein the communication line holder is a rotatable spool that rotates to deploy the communication line onto the surface.

* * * * *